(12) United States Patent
Klanke (10) Patent No.: US 6,313,791 B1
(45) Date of Patent: Nov. 6, 2001

(54) AUTOMOTIVE GPS CONTROL SYSTEM

(76) Inventor: Michael Dean Klanke, 21715 Parkbend, Katy, TX (US) 77450

( * ) Notice: Subject to any disclaimer, the term of this patent is extended or adjusted under 35 U.S.C. 154(b) by 0 days.

(21) Appl. No.: 09/321,029

(22) Filed: May 27, 1999

(51) Int. Cl.[7] ............................................. H04B 7/185
(52) U.S. Cl. ......................... 342/357.17; 342/357.06; 701/210; 701/213
(58) Field of Search .................... 342/357.06, 357.13, 342/357.17, 457; 701/213, 208, 210

(56) References Cited

U.S. PATENT DOCUMENTS

| | | | |
|---|---|---|---|
| 5,497,149 | 3/1996 | Fast | 340/988 |
| 5,504,482 | 4/1996 | Schreder | 340/995 |
| 5,532,690 | * 7/1996 | Hertel | 340/989 |
| 5,550,551 | * 8/1996 | Alesio | 342/457 |
| 5,729,192 | 3/1998 | Badger | 340/426 |
| 5,742,227 | 4/1998 | Escareno et al. | 340/426 |
| 5,790,973 | 8/1998 | Blaker et al. | 701/123 |
| 5,801,618 | 9/1998 | Jenkins | 340/426 |

* cited by examiner

*Primary Examiner*—Dao Phan
(74) *Attorney, Agent, or Firm*—Bracewell & Patterson LLP (57) ABSTRACT

This disclosure sets out a GPS receiver cooperative with a CPU having a memory. The memory enables inputting of data defining an electronic fence, i.e., a set of locations or a region where the vehicle is permitted to be operated. The electronic fence may be cooperative with a set of permitted driving instructions defining a delivery pathway for a set of stops, there being one or more delivery paths, which in conjunction with a clock, enables the vehicle to make delivery trips of a different nature at different times. Audio, visual and ignition control alarms are included to limit or stop vehicle operation outside the permitted locations.

19 Claims, 4 Drawing Sheets

AUTOMOTIVE GPS CONTROL SYSTEM

BACKGROUND OF THE DISCLOSURE

The term GPS refers to a global position system which provides data indicating these precise whereabouts of the GPS receiver. The GPS system is a 1990's extension of the old Loran system of World War II. That system was used to provide navigational data for ships at sea, especially those between the U.S. and Europe. In modern times, the GPS system has taken advantage of satellites which are stationed in synchronous orbits in space. Effectively, the satellite does not move with respect to a specific ground location on the earth so that it effectively has the operating advantages of a very tall antenna, indeed, an antenna extending about 20,000 miles up into space. A signal is transmitted from the GPS satellite and is received by a GPS receiver and data is processed which provides an indication of the location whereabouts of the receiver. GPS systems have recently been added to automobiles. They have common use in automobiles to especially provide the location of the automobile. Through the use of the GPS satellite, the on board GPS receiver and stored data, a screen can be presented to the driver which tells the driver the location of the vehicle with respect to a stored memory entry indicative of the map of a given city, to pick an example. The streets, buildings, and obstacles of a map in a given city are loaded into a CD ROM or other memory device and that data then is used to indicate to the driver the location or whereabouts with respect to the city. Sometimes, it can be used in a control or predictive fashion. This is exemplified by the patent of Blaker, which is U.S. Pat. No. 5,790,973. That helps determine the next freeway exit, thereby signaling to the driver what exit to take to arrive at a desired destination. As a further example, the recent patent of Schreder which is U.S. Pat. No. 5,504,482 uses GPS navigation to accomplish traffic routing around traffic jams and that sort of thing. Not withstanding the use of a GPS system as a 911 protection system regarding kidnapping, all as evidenced in the patent of Fast, which is U.S. Pat. No. 5,497,149. The present disclosure sets forth an improved and enhanced system which has GPS based responses. is U.S. Pat. No. 5,497,149. The present disclosure sets forth an improved and enhanced system which has GPS based responses.

In particular, the present disclosure incorporates a memory which is adapted to receive a set of grid coordinates comparable to latitude and longitude for limiting mobility of the vehicle. This could be used to confine a vehicle to a specified region. Consider as an example a typical rectangular county in the midwest where all four sides of the county are laid out as straight line segments of specific latitude and longitude. A large number of counties are defined in that fashion stretching all the way from central Texas up to the Canadian border. Counties laid out in this rectangular pattern provide an easy example. The examples given below, while easily stated in terms of arithmetic, can be extended to more complicated geographic patterns. Suffice it to say, and taking into account examples which will be given, the GPS system is used to build or define an electronic fence around a given area. This has salutary effect in the use of the vehicle. First, it is a mechanism by which theft of the vehicle is limited. Secondly, it is a system by which an authorized driver is authorized for a given area, but not for another area. In the latter instance, this will occur for vehicles which are carrying dangerous cargoes which are permitted in some areas, but not others. As another example, this will apply to a vehicle which has insurance for one geographic area, but the insurance policy is not effective for other areas. Finally, it is effective for particular drivers, for example, an older driver may be authorized for a larger area while a beginning teenager driver, will be authorized only for a specified area. The form of the electronic fence will be described in various examples given below, but it is a mechanism by which the vehicle operator is warned and subsequently the vehicle can then be shut down. The latter event is typically used to stop the vehicle as would occur on vehicle theft.

In another aspect of the present disclosure, another memory is used for loading of a pattern of streets. This can be used to great advantage to keep certain vehicles off certain streets. Again, with a vehicle which is hauling a flammable cargo, certain routes are set aside for such vehicles. The GPS system of the present disclosure assists in keeping vehicles confined to the specified routes. Furthermore, it can be used for authorized delivery routes of any type of delivery vehicle. There might be a specified route for morning deliveries while a different route would be implemented for evening deliveries. Other variations can be implemented such as different delivery routes for different days of the week or for different products. After a route is driven, it may be hard to recall changes tied to the day of the week, etc. The present disclosure sets out a system which particularly enables route drivers to find their way with a variety of routes. This is also especially true when a route is changed, an example being the loss of one customer and the addition of another customer. This may change the pathway of the route significantly. This enables the route to be modified, looking at the map, thereby enabling a highly efficient route to be developed in light of distances on the map, difficulties with left turns, and so on. Moreover, the information which is provided for the driver is keyed to the date and time of day so that the route driver is assured of following the right route at the right time. Changes in routes can be accommodated dynamically during use.

The present navigational system finds great benefit in a vehicle which is equipped with on board sensors to prevent burglary leading up to auto theft. While automotive alarm systems are old, the present disclosure cooperates with an alarm system which is a smart alarm system, i.e., one which shuts down the vehicle or otherwise provides alarm signals in the vehicle to protect the vehicle. The alarm system incorporated in the present disclosure provides two levels of protection. The first level of protection is protection against intrusion into the vehicle as might occur with night time theft. On the other side of the coin, the vehicle might be stolen in broad daylight, or at other times where the alarm system is not armed. This brings into play another aspect of the alarm system. If the vehicle is stolen and moved outside the permitted area, this requires transportation over the electronic fence. That can be used as a trigger to sound various and sundry alarms, giving a ten second warning, and then shutting off the ignition system. Also, it can be used to provide transmission of the vehicle whereabouts via cell phone. Examples of that will be developed below. In the alternative to that kind of interruption, an interruption using the audio and visual alarms can be implemented, forming a signal as an example to the operator to return to a specified road. Should the operator persist in driving on the wrong road or on the wrong route, then a warning can be given and the vehicle thereafter shut down after a ten or twenty second warning. The warnings have the value of shutting down the vehicle after forcing the driver to pull to the curb or to otherwise get out of the flow of traffic. This may still leave the vehicle parked illegally or obstructing traffic in some aspect, but at least it will give the vehicle driver enough time to pull to the side and get out of harm's way. There is an advantage to this, namely, that this kind of warning will enable the driver to pull to the side and to actually leave the vehicle. There is an advantage to this, should the vehicle operator be a thief, because it is desirable to let the thief pull over and get away from the vehicle. Alternately, the warning of ten seconds can be given at which time the vehicle pulls over and the doors are automatically locked, thereby holding the thief in the vehicle. The horn can then be sounded, or other warnings can be given to those in the near vicinity so that they will know that an illegal theft has occurred. Any number of steps can be undertaken depending on the on board audio and visual alarms provided with the present invention, and its cooperative connection to and triggering of door locks, window locks and so on.

In another aspect of the present disclosure, the vehicle provided with the present system can be tracked. This kind of tracking system can be used to charge a mileage based depreciation account. In vehicles which are assigned to a pool, the various trips using vehicles out of the pool can be charged to individual drivers or departments involved in use of the vehicle. While this is done now commonly with company owned aircraft, it may be expedient to extend that to company owned automobiles.

In another aspect of this disclosure, the system can be used to provide vehicle movement and tracking to thereby increment departmental charges for vehicle use and operation, or for insurance purposes. Some automobile leases are tied to mileage. This helps keep the driver informed of charges. This helps keep the home office informed of use, so that daily use charges can allocated if desired. These and other features and benefits result from the use of the present GPS based system. It is above all else a system which enables adaptability to be accomplished. The adaptability enables the vehicle to be protected while yet keeping track of the location of the vehicle when properly used, and especially enables interdiction of the vehicle when illegally used.

The present apparatus is summarized an onboard GPS system incorporating a GPS receiver cooperative with a microprocessor or CPU. The CPU is provided with two separate memories. In typical circumstances, one memory comprises instructions defining an electronic fence. This memory is loaded with the electronic fence data so that the fence is made up of border segments which close to a defined geographic area and that fence is encoded in terms of latitude and longitude so that the GPS system can determine whether the vehicle is inside or outside the fence. A second memory is included and is preferably implemented cooperatively with a CD ROM so that a local map can be input, and specific streets are authorized on that map. While the choice may be all streets on the map, the streets also can be limited so that delivery routes are implemented, and different delivery routes can be implemented for different days or different products. The system incorporates a set of connections to door and window sensors to detect wrongful entry. This enables system control of the automobile in response to the sensors. Indeed, if a burglar attempts to enter the vehicle, an alarm can be initiated. Moreover, if a thief does get possession of the vehicle, it can be tracked and its whereabouts determined; in an interactive fashion, the vehicle can either be automatically or reactively stopped with or without warning and with or without an opportunity to lock the doors, thereby preventing the thief from escaping. The system cooperates with automobile engine and electrical ignition system, generator system and battery. This system enables proper storage of all the travels of the vehicle and whether or not they are authorized (or unauthorized) depending on the electronic fence implementation or the route implementation described above.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be.

DETAILED DESCRIPTION OF THE PREFERRED EMBODIMENT

Figure 1A:
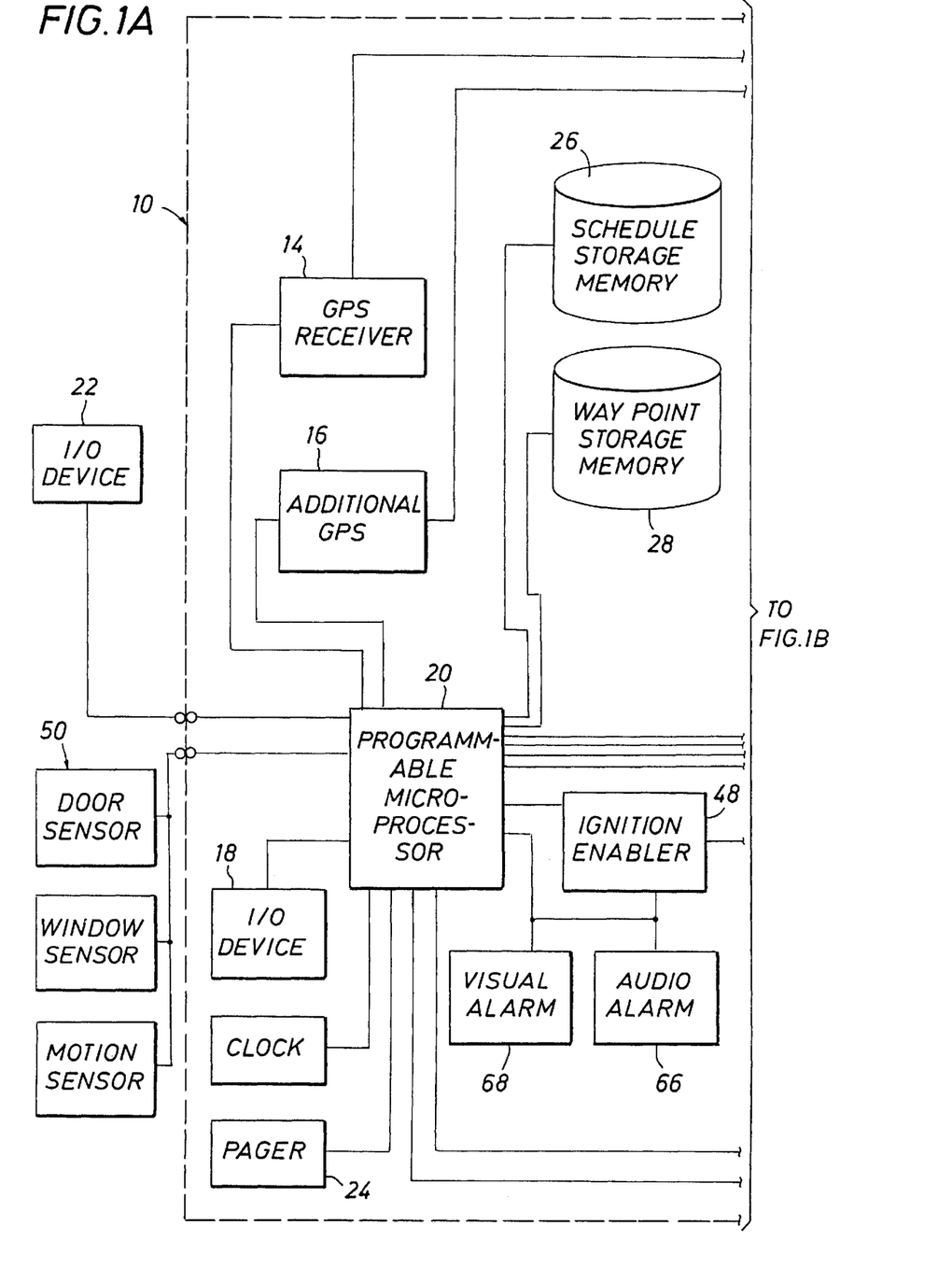
FIG. 1 is a schematic block diagram showing a GPS responsive system installed on board a car or truck to provide a display of vehicle position and to cooperate with an electronic fence or route map, or both, which are encoded into memory carried in the system of this disclosure.
Figure 1B:
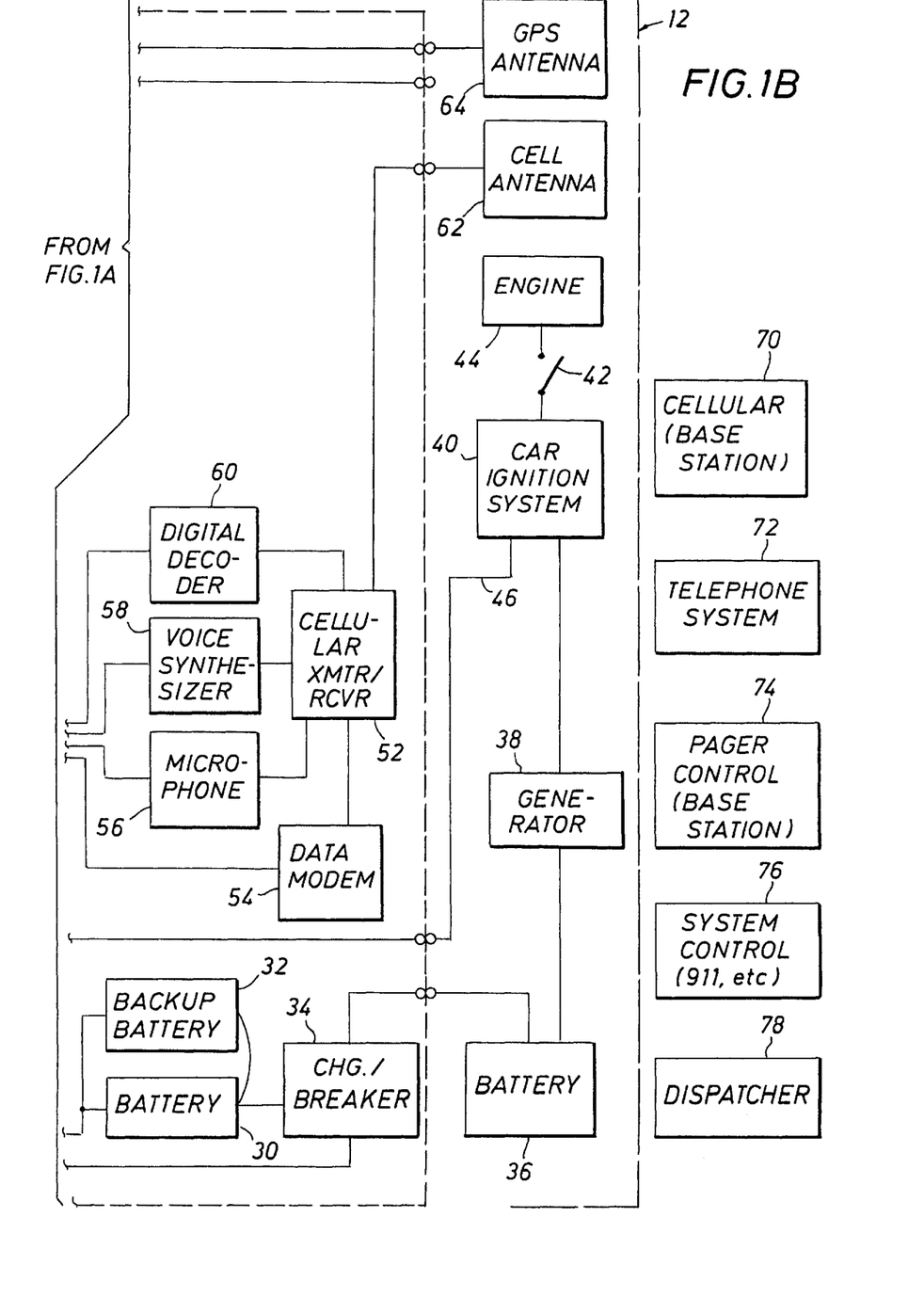

Attention is first directed to FIG. 1 of the drawings where the numeral 10 identifies the system which is located within the GPS cabinet of equipment mounted on a car, truck or other vehicle. A vehicle is represented by the line 12 as shown in FIG. 1 so that all the equipment to the left is located on or within the vehicle 12. The equipment to the right is located elsewhere and details of the locations will become more clear upon reading the present disclosure. For the moment, specific details of the vehicle including the size of the vehicle, the engine and other details regarding it will be introduced throughout the description of the GPS based system within the confines of the cabinet 10. A single cabinet is preferred, but the devices making up the present system can be scattered on the vehicle. Commonly, however, it has the form of a unified system so that it can be added as a unitized accessory. To the extent that some of the components in this apparatus have dual usage, they may be located elsewhere or they may be integrally constructed. An example of this is the cell phone which will be described in some detail hereinafter. That cell phone can be integrated in the structure or can be provided as a detachable component or can be remotely installed within the vehicle 12.

The GPS system 10 of this disclosure comprises a first GPS receiver 14 and a second GPS receiver 16 which is otherwise identical. The function of the two will be noted. Effectively, both operate to receive signals from an overhead satellite which is maintained in a synchronous orbit, i.e., from the relative point of view of the Earth, the satellite stays over the same location. Several such GPS satellites are already in use and of the satellites around the Earth is controlled so that the satellites hold a steady position. They are viewed at the same latitude and longitude in the sky from a given point on the Earth. Multiple GPS satellites exist so that different regions of the Earth are illuminated by the antenna transmitted data from the GPS satellites. By various GPS satellites distributed appropriately around the world, the entire Earth is provided with GPS data which is therefore enabled to respond by locating the position of the GPS receiver. Such a receiver is incorporated at 14. Commonly, the output of the GPS receiver is defined by a coordinate system. That is normally the latitude and longitude of the target receiver. The accuracy of the GPS system is sufficient that the precise location can be determined, and this determination is made in real time in repetitive operation so the pathway or the resting position of the receiver can be determined usually within about three meters.

The present apparatus utilizes a CPU 20 which is appropriately provided with input instructions through a I/O device 18, and there is a vehicle located I/O device 22 for remote entry of data and instructions. For instance, the I/O device 22 can be an external keypad for easy operation by a person outside the vehicle to open the vehicle. Some access code is entered. Also, the access code, on entry, can be used to disarm a vehicle alarm system. The alarm system is operated through the I/O device 22 which simultaneously initiates operation of the GPS system through the CPU 20. The CPU 20 outputs position in the form of latitude and longitude to a pager 24. The use of that will be noted below. The CPU operates with a schedule storage memory 26 and a separate memory 28 which enables inputting of data establishing two or more separate confining perimeters for the vehicle. The first is a surrounding electronic fence. The electronic fencewill be discussed and defined below. The second is a set of permitted (versus forbidden) streets or locations within the fence. Examples of that will also be given below. The GPS system 10 is provided with electric power by a primary battery 30 which in turn is protected with a back up battery 32. A voltage regulator 34 is connected to the vehicle battery 36. The vehicle battery 36 is provided with electric power from the vehicle electric generator 38. The battery 36 and the generator 38 together cooperate with the vehicle ignition system 40. That system responds to operation of the starter switch 42 to operate the vehicle engine 44. The ignition system 40 is enabled by a signal from the GPS to operate. Indeed, the ignition system 40 is also enabled with a signal from the security system as will be explained. It is permissible, even recommended, that the vehicle security system connect through the CPU 20 to take advantage of its availability, and thereby provide the enable signal for the car ignition system. The enable signal is routed from the CPU 20 through an ignition enable circuit 48 and is delivered through the conductor 46 to the car ignition system 40. Conveniently, the car ignition system 40 is provided with an enable switch such as a relay held in the closed position to enable current from the electrical system for the ignition system. In the event of an alarm condition by the vehicle security system, that alarm condition is sensed and the vehicle can be shut down completely. Such a shut down simply involves depriving the ignition system of electric current. By doing that, the vehicle will be stopped without electrical power for operation of the engine. While it may appear to be something of an extraneous observation, in fact the vehicle security system has enhanced value when supplemented with the GPS system of this disclosure. The supplementation is achieved by incorporating the security or alarm system with the GPS system 10. To expand on this, note the incorporation of the several sensors 50 which are connected with the CPU 20. These sensors respond to intrusion through the door, or perhaps through a window, or through vehicle motion and thereby form an alarm condition transmitted to the CPU 20. After the data is processed, one result thereof may well be shutting down the automobile by switching off electric current to the ignition system 40 so that the engine 44 will not operate. Having noted that, that virtue is worked into the GPS triggered protocols described below so that vehicle shut down can be done readily.

Another aspect of the present disclosure is the incorporation of a cell phone with a built in transmitter and receiver. The phone 52 can be used optionally with a modem 54 for transmission of digital data. As needed, the cell phone 50 can be provided with a microphone 56 remote from the cell phone which is provided with an enable signal from the CPU 20. Alternately, the microphone can receive synthesized speech prompted by the CPU. Specific recorded verbal messages stored in memory can be transmitted or the speech can be synthesized by other techniques through the voice synthesizer 58. Digital transmission can be two-way so that digital data is sent through the modem 54 or received through the digital decoder 60. All of these serve as inputs and outputs to the cell phone 52. The cell phone.52 operates with a vehicle mounted cell phone antenna 62. A second antenna is included for the GPS system. The antenna 64 is typically a small antenna like the telephone antenna. Because the frequencies are relatively high, the wave length is relatively short so that the antennas are not large and therefore they are relatively inconspicuous.

VEHICLE OPERATION WITH AN ELECTRONIC FENCE

The present disclosure sets out a method for confining a vehicle for operation within an electronic fence. The electronic fence is implemented by storing data indicative of a border around a permitted area. Going beyond that area is prevented. For easy representation, assume that the rectangular area where the vehicle is permitted to operate is defined by four straight line segments inscribing a rectangle where the lines extend precisely on latitude and longitude lines. It is not uncommon for many of the counties of the U.S. to be inscribed in this fashion. Especially, the central U.S. is formed by regular rectangular counties where the county lines are precisely drawn north and south or east and west. Because the arithmetic can be shown rather simply, the following two equations set out the implementation of this:

1) $latitude_1 < x < latitude_2$
2) $longitude_1 < y < longitude_2$

The permitted position is represented by the vehicle location of x and y, and by implementation of the equations shown. The location of the vehicle is determined within the permitted area. This confines the vehicle within the electronic fence.

Dependent on the driving circumstances, it may be apt to make the electronic fence either hard or soft. By that term, the fence can be implemented in the following two representative fashions. By observation of equations 1 and 2 above, it can be determined that the vehicle has just crossed the electronic fence and has ventured outside the permitted area. In a routine stored in memory, the CPU 20 will recognize this fact and thereby sound an alarm through the audio alarm 66 or the visual alarm 68, or both. A signal is provided which works with the ignition enable circuit 48 which ultimately shuts down the vehicle by disabling the car ignition system 40. The audio and visual warnings sounded can provide a one or two minute warning to the drive to go back inside the fence and return where the vehicle is permitted. Actual shut down is accomplished through the circuit 40 which responds to the ignition enable circuit 48. With a count down provided, both visually and by audio output, the driver is adequately warned so the driver can pull the vehicle to the curb. Or, with that kind of warning, the driver can drive back towards or into the permitted area. By continuous measurement of the GPS location, as the distance from the vehicle to the fence is reduced, implying that the vehicle is pointed back into the permitted area, the count can alternately be suspended. This will enable the driver to pause at a red light and then drive down the appropriate street or road toward the permitted area. By approaching it this way, the driver returns to that area either with the count down proceeding or suspended as the case might be.

The foregoing is defined as a hard fence leading to the actual shut down of the vehicle. Another approach, however, is a soft response, i.e., the vehicle is not shut down by interrupting the ignition system, but a signal indicating the vehicle is outside the confines of the permitted area is formed and transmitted. This might occur with a delivery service where the vehicle is simply lost. On getting outside the permitted area, a signal is compiled and sent through the cell phone 52. It can be transmitted to a dispatcher elsewhere (through equipment to be described) at which time the driver is put into voice contact with the dispatcher. This will help if the driver is simply lost and cannot find a pathway back to the permitted area. It also is useful in the event that the driver encounters some kind of road damage or storm interruption and events of that sort. The driver can then talk with the dispatcher and vouch for the on-road difficulties mandating a trip outside the zone. Intermediate remedies can be implemented then, for instance, the dispatcher can, if need be, transmit a signal which will implement the shut down procedure of the vehicle. This may occur where the driver has ventured outside the permitted area, the dispatcher is aware of certain disqualifications on the vehicle, and may choose to disable the vehicle from a remote location.

VEHICLE OPERATION ON MULTIPLE ROUTES

Figure 3:
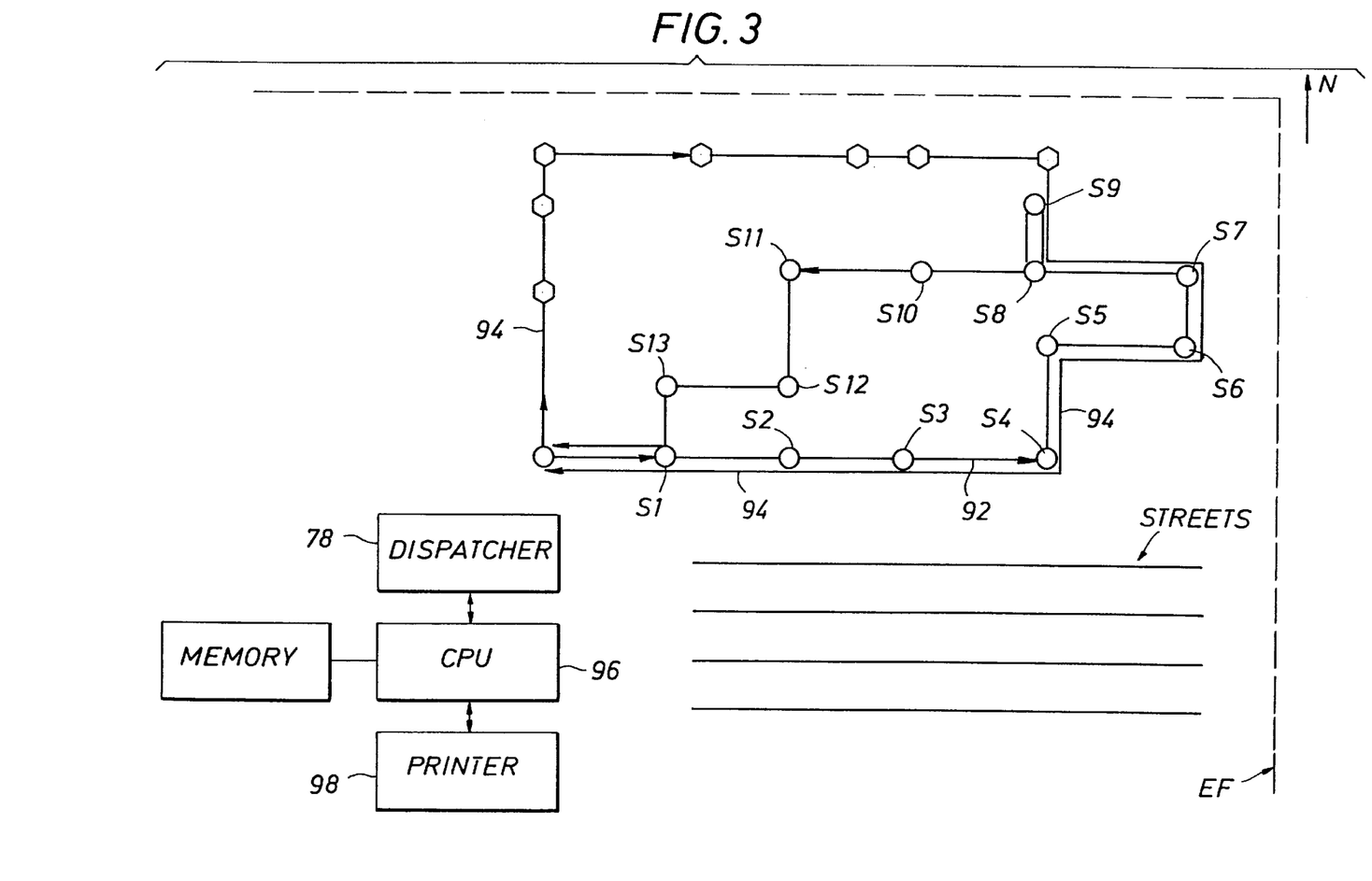
FIG. 3 is a simplified schematic of a first route driven by the vehicle in conjunction with a second route which partly overlaps the first route, and which additionally shows the equipment available to the dispatcher including a CPU and I/O device.

Assume that a vehicle is required to drive at least two separate routes as shown in FIG. 3. Assume for purposes of description that the routes are significantly different. They may have several legs on each route, multiple stops along the route, and the routes are comprised of multiple segments which end after traveling each of the two or more routes. For ease of description, the first route will be described as the morning route and the second route will be described as the evening route. This is a route situation that might occur on delivery of some product and subsequent retrieval of the used product, empty containers, and so on. The first is exemplified by delivery of food in containers to a string of restaurants. Assume that the containers are expensive, i.e., freezer cabinets for fresh fish, milk cans and so on. The morning route involves delivery of the ice chest with fish in it, or a refrigerator chest with cartons of ice cream, milk, and other dairy products. The vehicle is operated along the first route. At each stop, a particular event occurs, for instance, at 20 stops on the first route. The first route is deployed by determining a pathway for the vehicle. That pathway is then stored in memory. The pathway is made up of street segments between the sequenced delivery points. It begins and ends at home base, depot, warehouse, or other starting point. For ease of description, that will be illustrated in FIG. 3 as the home base H. The first route, or morning route 92 thus involves the exemplary stops $S_1$ to $S_{13}$ along the pathway and to the home base $H_v$. Since it is the morning route, it typically will begin early in the day. For some industries, it may be very early, i.e., before daybreak. The GPS control system of the present disclosure signals to the driver the location of the vehicle along the route and also signals the location, address, or other useful information about the first delivery stop. Each of the $S_n$ (where n is an integer) delivery points will be identified as route stops. Upon leaving the home base H, the first stop $S_1$ is then attended to, and then the vehicle is driven to the second stop $S_2$ and so on. Through the use of the GPS system of this disclosure, verification is sent to the home base H that each stop $S_n$ has been accomplished. The enables the home base H through the dispatcher to receive data or information dynamically. If a customer, subscriber, or recipient at one of the later stops suddenly determines that they need added service, they can call the dispatcher. The dispatcher can observe the whereabouts of the vehicle by transmitted information indicative of the whereabouts, and then a signal is sent to enhance the delivery instructions for the unfinished stops. In that instance, the vehicle can be loaded with extra supplies at the home base.

Assume for example that the vehicle is a refrigerator truck, and the truck is loaded with all the materials necessary to accommodate the $S_n$ stops. Each stop is provided with its own inventory list, i.e., in the form of a delivery ticket. The delivery ticket can be printed as verification through the use of the GPS system and the I/O device 18. It determines and knows the whereabouts of the vehicle so that the right delivery ticket for the right stop is printed. That ticket information typically will include the name and address of the stop, the time of day and the identification of the driver or vehicle. In addition to that, the present system contemplates the input of delivery ticket information, i.e., the goods, merchandise, or service which is rendered at that designated stop. This enables the inventory in the vehicle to be decremented progressively. This can be useful in invoicing and inventory control. In other words, the vehicle is loaded, the total of the goods placed on the vehicle is summed, and then the delivery tickets are formed at each of the stops. The delivery tickets can have the form of a printed invoice obtained through the I/O device 18 cooperative with the GPS system of this disclosure. This enables delivery of the goods and merchandise. And, most effectively, the vehicle operator can be signaled during mid route to change the delivery for the remaining stops.

On the evening route 94, assume that it is different. Assume that the evening route encompasses pick up of empty containers which are much lighter in weight and which nest when stored in the vehicle. It might be possible to accommodate 30 or 40 stops during the evening route. This commonly occurs with bread delivery trucks. Bread is difficult to stack. Accordingly, it is normally stacked in open wire baskets which store the bread in a manner that prevents crushing. However, when empty, the wire baskets nest and stack. In the morning delivery route, assume that 150 racks of bread are delivered. Several hundred racks can be picked up on the evening route 94 and carried back. In effect, they stack by nesting and are accounted for on a different basis. They serve great value to the bread company, but they are primarily "in the way" of the recipients. To the individual stops, the bread racks may not be very important, but they represent a substantial capital cost. Therefore, the evening route is a pick up route where a number of these are retrieved and loaded into the vehicle. Two or three hundred can easily be stored by nesting the racks. Many other examples of pick up and delivery can be extrapolated from this disclosure.

The evening route 94 departs in a different direction from the home base H. This route extends through a set of locations which are different in part compared to the locations for the morning route 92. As shown, the evening route 94 proceeds through a set of pick up locations indicated by the symbol $P_n$ where n is a whole number integer. It proceeds through a number of pick up locations and finally comes to the stop $S_9$ and then begins retracing certain stops of the morning route in the reverse sequence. By this approach, a different route driven at a different time of the day or the week is implemented, and the different route passes through many of the same locations of the morning route to make collections of empty bread racks, storage containers, and the like. As will be understood, other days may implement a separate pick up route which would proceed through the stops $S_{10}$, $S_{11}$ and so on. To this end, a part of the delivery route can overlap a part of the pick up route, and each route driven will in part pick up the empty containers, baskets or other equipment distributed earlier with goods. The system implemented at the home base H includes features which are discussed below.

It is sufficient to note that the operation on multiple routes enables the vehicle to be an interactive link in the distribution chain. One aspect of this disclosure is that the routes are specifically authorized and controlled. Should the driver accidentally turn in the wrong direction or should the driver forget the next stop, the equipment can be used automatically to locate the vehicle and to prompt the driver. The prompt might be a visual screen which says that the next stop is at a specific address, that the delivery ticket must be handed to a particular person, and the goods actually ordered are specifically identified. That is very helpful to the driver and avoids driver confusion, especially when the delivered goods change from day to day and stop to stop.

The present apparatus assists significantly in controlling the driver so that the optimum routing can be achieved. The dispatcher may write a new route daily and transmit it to memory. Or, the route may be fairly well fixed and left in memory for a long time without modification. To accomplish better control and reduced delivery costs, the route can be optimized. The route through multiple stops is laid out on a map, and then the various stops are arranged in a sequential delivery pattern to reduce transit time or reduce total mileage or operating costs for the driver and vehicle. As new stops are added and old stops deleted, the shape of the route might change over time, and the sequence might be changed also. The present apparatus contemplates the storage of the route information including all the stops in memory. This is done time and time again to accommodate the driver and vehicle.

There is little risk of armed high-jackers for routes which deliver raw goods, i.e., food products, lumber, and so on. There is a greater risk, however, where routes are driven with expensive goods which may be sold and paid for on delivery. For instance, many restaurants will pay for more expensive beverages when they are delivered. This is especially true with beer, wine, and other spirits. In that instance, it may desirable that some measure of security be incorporated with the vehicle. That security takes into account the route and stops, and assures that the route has the optimum and secure, i.e., by avoiding back streets and the like where armed high-jackers might lurk. This is especially a problem for delivery vehicles which receive payment either on delivery or at least periodically. It might be apt that the payments, whether in cash or check, be acknowledged via the GPS system of the present disclosure, and instructions be incorporated to the driver so that route departure then is absolutely forbidden. In other words, the route become obligatory for the driver. This will certainly help in the case where cash payments are received and deposited in a vehicular cash box. An armed high-jacker may instruct the driver to depart from the route to a more remote location so that the cash box can be penetrated. Such robberies are not uncommon. The present invention helps in that regard by providing a hard shut down of the vehicle. As soon as the vehicle departs from the intended route, a warning is sounded for the vehicle operator, namely that the vehicle will shut down in a few seconds if it does not return to the route. Then, shut down can occur in an orderly fashion. If need be, it may be apt that no warning be given through the alarms 66 or 68. Rather, on departure from the intended and programmed route, a signal is transmitted that such a departure has occurred. This signal then indicates to the dispatcher that the vehicle is going the wrong way which raises the presumption of an armed high-jacker. In that instance, shut down can then be turned over to the dispatcher. This will enable the dispatcher to summon law officers who will intercept the vehicle, and who can then call for shut down through the dispatcher. That is accomplished as illustrated in FIG. 1 of the drawings.

The systems shown in FIG. 1 include the base station for the cell phone. The cell phone 52 communicates with a base station located elsewhere and which is indicated by the numeral 70. The base station for the cell phone system cooperates with the telephone system 72. In conjunction or as an alternate, there is a base station 74 for the pager system. All of these cooperate with a security control identified at 76. This enables the routing of law officers and the like to the vehicle. By making transmissions through the cell phone 52 to the cell phone base station 70 and then into the telephone system, signals can be input to a dispatcher for operation. This enables two-way communication through the dispatcher 78.

CONTROLLED CARGO DELIVERY

Figure 2:
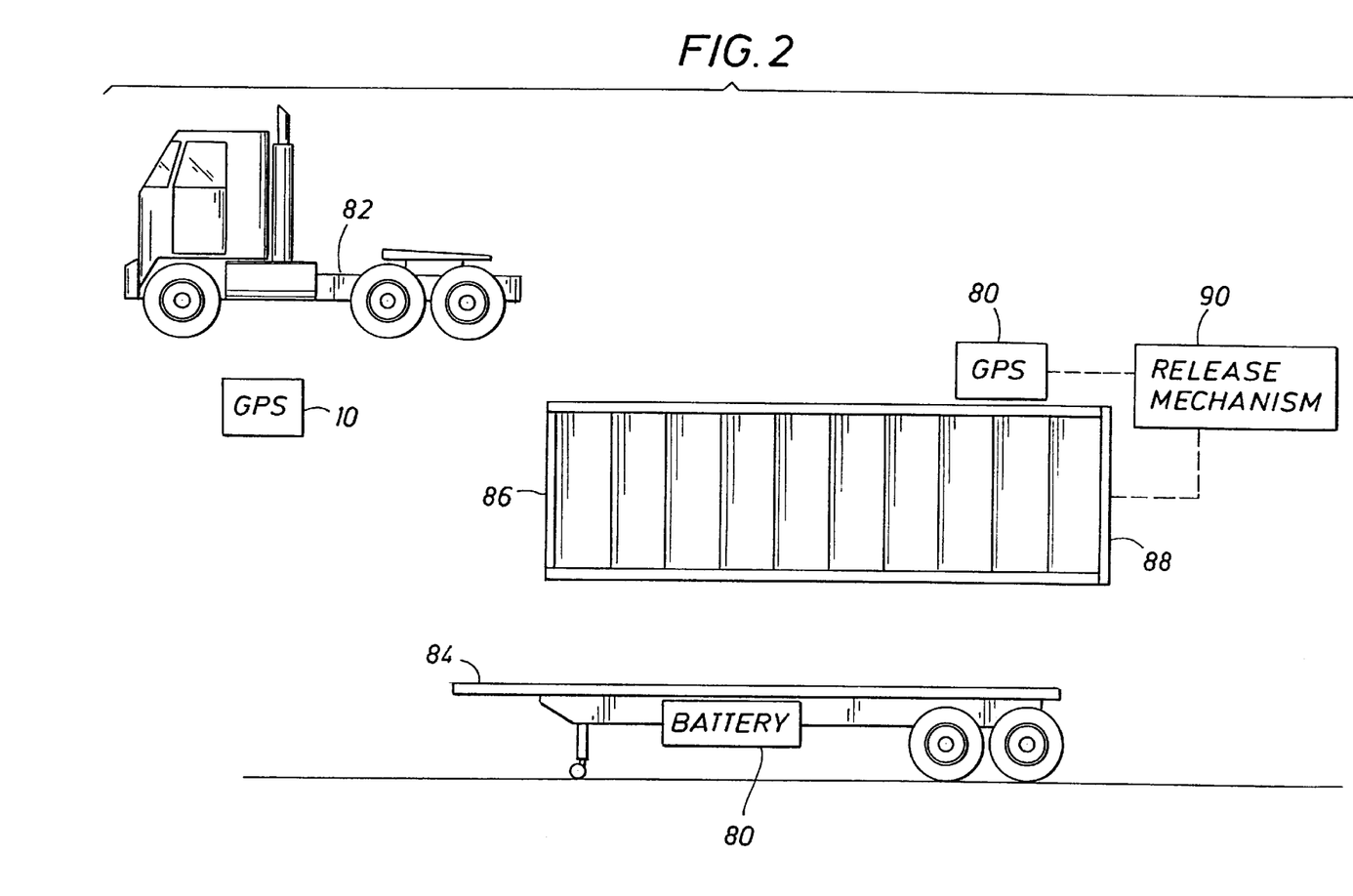
FIG. 2 is a side view showing a car and a tractor towing a trailer which can be equipped with the present invention.

The equipment shown in FIG. 1 and encompassed in the line 10 is equipment located on board the vehicle. All of that equipment can be duplicated and loaded into a cargo container. A simplified version of this equipment is put in the cargo container. Such a simplified version is illustrated in FIG. 2 of the drawings. The whole system is identified again in FIG. 2 which is mounted aboard the tractor. The tractor in this instance pulls a trailer. For purposes of nomenclature, the tractor 82 has a fifth wheel which engages a trailer 84. The trailer 84 supports a container or box 86. The box is equipped with a door 88. The box or container 86 can be separate from the trailer as occurs with containerized ocean going cargo. Or, it can integral in the fashion which is readily seen on the highways of this country. Typically, the container is built on a set of rails which are integrally joined under the box or container. It can be a sealed container, i.e., one having doors which close and lock. Variations include containers which are ventilated for hauling livestock, or containers which are refrigerated for hauling cold cargo such as fresh meat, fish, flowers, and the like. Of particular importance, the present invention contemplates the use of the disclosed GPS system 10 aboard the tractor. A stripped version is identified by the numeral 80. It is located either on the trailer or on the separable box container 86 or on both. Consider as an example the following stripped version of equipment. A battery system is deployed in the box 80. The GPS system in this instance includes a receiver 14, CPU 20 and some sort of electronic communication responsive device such as the pager 24. Memory components are used to store information as exemplified at 26 and 28. It is not necessary to have an output device 18. Rather, this version of equipment is merely passive and transmits periodically the location of the equipment. For instance, the pager 24 can be operated once every 10 minutes, or once per day to indicate the location of the trailer. Trailers are not readily subject to theft except where the cargo loaded on the trailer has value. In that instance, it might be appropriate to locate the GPS equipment 80 in the cargo container 86. For security sake, the door 88 is locked. It is locked until the GPS system 80 determines that it is at the intended location which has an exclusive latitude and longitude address. Opening is also based on timing, i.e., it is at the right address on the right time of day and the right date. In that instance, the CPU 20 operates to generate a lock opening signal from the GPS system 80 transmitted to the lock release mechanism 90. That unlocks the door 88 so that the container can then be unloaded. This locks the container after loading through shipment and to the actual moment of delivery at the intended location. Then, the unmanned container can be opened. Should anyone attempt to jimmy the lock 88, an alarm condition can be generated through the door sensor 50 and a signal transmitted through the pager 24 to alert appropriate authorities.

DISPATCHER GENERATED INSTRUCTIONS

The dispatcher typically will stay in touch with the vehicle driving the route. The GPS equipment 10 illustrated in FIG. 1 is used to trace out the segments of the morning route 92 as illustrated in FIG. 3. The home base H is typically the location for the dispatcher. The dispatcher location at the home base H includes the dispatcher in the necessary transmitter and receiver to maintain electronic communications. This can at least be a cell phone or a conventional telephone with a land line connected from the dispatcher 78 to the vehicle 10. In addition, FIG. 3 shows the dispatcher to have available for operation a CPU 96. It works in conjunction with a printer 98. The dispatcher operates the CPU to form and format instructions which go to the vehicle 10. For instance, the dispatcher may know by keeping track of the vehicle that the vehicle has left the customer at $S_3$, and will learn that the customer at the stop S6 wants a larger delivery of a particular item. By inputting data to the CPU 96, the signal can be formed and transmitted to the vehicle 10, and the instructions for the driver can be changed for that particular stop. The instructions can increase or decrease the amount of goods delivered, and otherwise change the instructions for delivery. If the dispatcher receives instructions that the stop $S_9$ does not need anything then it can be skipped completely, which will change the route 92 significantly. If the dispatcher learns of road repairs or other difficulties impacted ease of traffic along the route 92 (recall that this is the morning delivery) then the dispatcher can use that information to change the route 94 for the afternoon or evening to go around the area of traffic difficulties. All of this can be dynamically loaded and transferred to the vehicle to change either the route 92 or the route 94 or the amount of goods either delivered to or picked up from the respective stops on the two routes. In effect, this permits and enables the route driver to travel the particular dynamically adjusted routes with greater ease and facility.

FIG. 3 also shows another aspect of the present invention mentioned earlier. The symbol EF identifies the electronic fence which encompasses a particular area. A portion of the electronic fence is represented in the dashed line and shows how the routes are configured within the fence. Moreover, the electronic fence is shown enclosing the routes 92 and 94. There may be other streets inside the electronic fence which are not used in driving the routes. For instance, FIG. 3 shows a number of added streets, but the routes 92 and 94 do not use them. For any of several reasons, the several east-west streets marked in FIG. 3 should not be used. They are not permitted on the route maps. The routes 92 and 94 stay away from the east-west streets, for example, they may have no parking zones posted thereby preventing easy delivery, or they may be too narrow, or they may have an excessive number of stop signs or traffic signals. Traffic optimization takes into account such obstacles, and thereby enhances the routes 92 and 94 for quicker delivery as well as reduced transit time, driver safety, traffic congestion and so on.

The several streets shown in FIG. 3 that are not used, may be within the electronic fence EF, but they are undesirable for reasons best determined in the area.

While the foregoing is directed to the preferred embodiment, the scope is determined by the claims which follow:

What is claimed is:

1. A vehicle supported GPS system comprising:
   (a) a GPS receiver for receiving signals in determining the location of a vehicle supporting the GPS system;
   (b) a CPU with memory provided with vehicular permitted locations and permitted times, the CPU further receiving the GPS receiver generated location of the vehicle so that the CPU is enabled to compare vehicle location with vehicle permitted locations from memory and forming an indication that vehicle location is permitted; and
   (c) a clock providing a time signal to the CPU, wherein the CPU is enabled to compare the time signal with the permitted times, thereby forming an indication that vehicle time is permitted.

2. The apparatus of claim 1 wherein said CPU is provided with a first memory storing an electronic fence around a specific geographic area so that the vehicle is permitted within that area, and said CPU compares the vehicle location with the area inside the electronic fence to determine that the vehicle is permitted therein.

3. The system of claim 2 wherein said electronic fence is defined by permitted latitude and longitude designated locations, and said CPU compares vehicle location latitude and longitude to determine permitted locations thereof, and further including a circuit connected said CPU which stops vehicle operation on leaving the permitted location defined by the electronic fence.

4. The apparatus of claim 2 wherein said permitted vehicle location is defined by a route on streets, and said vehicle is permitted to drive the route on the streets, and said CPU forms a signal indicative of driving the routes thereby permitted.

5. The apparatus of claim 4 wherein said memory stores at least one route and said route begins with a home base location and extends down streets to return the vehicle to a designated return location at the conclusion of the route.

6. The system of claim 5 wherein said vehicle stores multiple routes and said routes are implemented at different but permitted times as defined by the clock connected to said CPU.

7. The system of claim 1 wherein said CPU with permitted location data from said memory determines that the vehicle has left a permitted area and forms a signal indicative thereof and which signal is provided to a vehicle ignition enabling circuit to stop operation of the vehicle.

8. The system of claim 2 wherein said vehicle system incorporates a cell phone to transmit or receive data relating to permitted vehicle locations, and said vehicle is equipped with vehicle sensors comprising an alarm system for the vehicle wherein said alarm system and sensors are armed selectively by said vehicle supported system.

9. The system of claim 8 wherein said phone handles electronic fence data.

10. The vehicle system of claim 1 including a cabinet enclosing said vehicle supported GPS system, and said cabinet connects with the vehicle ignition system to provide an enabling signal thereto for operation of the ignition system, and additionally connects to a vehicle supported I/O device for control of the vehicle supported system.

11. The system of claim 10 wherein said cabinet encloses a battery for said GPS system and comprising a battery separate from the vehicle battery.

12. The vehicle supported system of claim 10 further comprising a visual alarm forming an output of the indication that vehicle location is permitted.

13. The vehicle supported system of claim 10 further comprising the audio alarm forming an output of the indication that vehicle location is permitted.

14. The vehicle supported system of claim 10 further comprising the vehicle ignition system enabling circuit forming an engine control signal while the vehicle location is permitted.

15. The vehicle supported system of claim 1 further comprising a receiver remote from the vehicle and a transmitter, wherein the transmitter is adapted to transmit a signal to the remote receiver forming an output of the indication that vehicle location is permitted.

16. The apparatus of claim 1 wherein a computer memory for said CPU receives a closed geometric pattern electronic fence data representation stored in memory and further wherein said CPU connects with a visual indicator for the driver to indicate vehicle location within said electronic fence, and said system further comprises a connected electronic communication link to an off vehicle receiver for transmission of permitted vehicle location to the receiver remote from the vehicle.

17. The apparatus of claim 16 wherein said receiver and CPU are continuously operative to determine vehicle location in response to the GPS determining signals, and further including a continuously operative vehicle connected ignition system enabling circuit provided with a signal from said CPU so that vehicle operation continues so long as the enabling signal permits, and said vehicle ignition system is constructed and arranged to interrupt operation of the vehicle engine.

18. The apparatus of claim 17 including a vehicle electrical system forming a current flow for said ignition system.

19. The apparatus of claim 18 including a vehicle mounted keypad to open the vehicle and an operator exposed ignition switch.

* * * * *